(12) United States Patent
Benoit et al.

(10) Patent No.: US 12,232,041 B2
(45) Date of Patent: Feb. 18, 2025

(54) SPECULATIVE ACTIVATION FOR SECURE ELEMENT USAGE

(71) Applicant: Google LLC, Mountain View, CA (US)

(72) Inventors: Olivier Jean Benoit, San Diego, CA (US); Prasad Modali, Fremont, CA (US); Vinoth Kumar Deivasigamani, San Diego, CA (US); Benjamin K. Dodge, San Jose, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 17/758,277

(22) PCT Filed: Mar. 12, 2020

(86) PCT No.: PCT/US2020/022266
§ 371 (c)(1),
(2) Date: Jun. 30, 2022

(87) PCT Pub. No.: WO2021/183127
PCT Pub. Date: Sep. 16, 2021

(65) Prior Publication Data
US 2023/0023587 A1    Jan. 26, 2023

(51) Int. Cl.
*H04W 52/02*    (2009.01)
*G01S 5/02*    (2010.01)
(Continued)

(52) U.S. Cl.
CPC ....... *H04W 52/0235* (2013.01); *G01S 5/0205* (2013.01); *H04W 12/08* (2013.01)

(58) Field of Classification Search
CPC . H04W 52/0235; H04W 12/08; H04W 12/06; H04W 12/63; H04W 12/65;
(Continued)

(56) References Cited

U.S. PATENT DOCUMENTS 8,827,164 B2    9/2014    Jolivet
10,121,144 B2    11/2018    Khan et al.
(Continued)

FOREIGN PATENT DOCUMENTS

CN    106255984 A    12/2016
WO    2021183127    9/2021

OTHER PUBLICATIONS

"International Search Report and Written Opinion", Application No. PCT/US2020/022266, Oct. 30, 2020, 14 pages.
(Continued)

*Primary Examiner* — Vu V Tran
(74) *Attorney, Agent, or Firm* — Colby Nipper PLLC

(57) ABSTRACT

If a secure element accesses a resource that is separate from the secure element, conducting a secure transaction can be inefficient in terms of power or time. Power usage is inefficient if the resource is never permitted to sleep, and transaction time is inefficient if the resource is permitted to sleep, and the user experiences a delay. To enable dual efficiency, a resource entity is permitted to be powered down. The resource entity is then powered up speculatively by an activation controller. The activation controller predicts an upcoming secure transaction based on sensor output, such as a position fix or a detected electromagnetic field. Based on monitored sensor output, the activation controller issues an activation signal to power up the secure element or the resource entity prior to initiation of the upcoming secure transaction. Thus, power can be conserved without introducing a transaction-processing latency.

20 Claims, 8 Drawing Sheets

(51) Int. Cl.
| | |
|---|---|
| *G06F 1/3287* | (2019.01) |
| *G06F 21/35* | (2013.01) |
| *G06F 21/77* | (2013.01) |
| *G06K 7/10* | (2006.01) |
| *H04B 5/72* | (2024.01) |
| *H04L 9/40* | (2022.01) |
| *H04W 4/80* | (2018.01) |
| *H04W 12/06* | (2021.01) |
| *H04W 12/08* | (2021.01) |
| *H04W 12/63* | (2021.01) |
| *H04W 12/65* | (2021.01) |

(58) Field of Classification Search
CPC .......... H04W 4/80; G01S 5/0205; H04B 5/72; Y02D 10/00; Y02D 30/70; G06F 1/3287; G06F 21/77; G06F 21/35; G06K 7/10128; H04L 63/0492; H04L 63/0853; H04L 63/107
See application file for complete search history.

(56) References Cited

U.S. PATENT DOCUMENTS

| | | | |
|---|---|---|---|
| 10,242,366 | B2 | 3/2019 | Taveau et al. |
| 2015/0019892 | A1 | 1/2015 | Agrawal et al. |
| 2015/0121108 | A1* | 4/2015 | Agrawal ............. H04L 63/0853 713/323 |
| 2018/0196490 | A1* | 7/2018 | Ail ........................ G06F 1/3287 |
| 2019/0251546 | A1 | 8/2019 | Khan et al. |
| 2020/0042850 | A1* | 2/2020 | Singh ....................... H04B 1/38 |
| 2020/0288306 | A1* | 9/2020 | Do ........................ H04W 12/37 |

OTHER PUBLICATIONS

"International Preliminary Report on Patentability", Application No. PCT/US2020/022266, Sep. 6, 2022, 9 pages.

"Foreign Office Action", CN Application No. 202080075220.4, Jul. 29, 2024, 29 pages.

"Foreign Office Action", EP Application No. 20717047.3, Sep. 26, 2024, 7 pages.

* cited by examiner

SPECULATIVE ACTIVATION FOR SECURE ELEMENT USAGE

RELATED APPLICATION(S)

This application is a national stage entry of International Application No. PCT/US2020/022266, filed 12 Mar. 2020, the disclosure of which is incorporated herein by reference in its entirety.

Background

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Additionally, one electronic device—the smartphone—has practically become a necessity to have within arm's reach. With electronic devices becoming pervasive and crucial to many aspects of modern life, device security has become imperative.

Many people are familiar with malware, which is sometimes generally referred to as a "computer virus." A resilient and robust operating system, safe computing practices, and an anti-malware program can help keep a user's information safe from threats by combating many types of malware. The security of information stored by electronic devices can, however, also be jeopardized through physical attacks on hardware and radio-frequency (RF) attacks on wireless communications. In other words, some attacks by bad actors can circumvent or undermine the practices listed above to enable a bad actor to access information that was intended to be kept safe. Furthermore, these practices are not invulnerable.

The hardware of an electronic device includes at least one integrated circuit (IC) that provides intelligence to enable some desired functionality, including functionality that may utilize information that is to be safeguarded. To support protection of this information, some electronic devices include security circuitry to facilitate encryption and decryption of the information that is to be safeguarded, such as financial data, passwords, and secret keys. Unfortunately, bad actors may attempt to undermine the cryptographic services of such security circuitry. Bad actors may also attempt to hijack information that is transmitted wirelessly to or from an electronic device. Consequently, it is beneficial to incorporate into an electronic device hardware that can support safely using information in cryptographic or wireless communication environments.

This Background section is provided to generally present the context of the disclosure. Unless otherwise indicated herein, material described in this section is neither expressly nor impliedly admitted to be prior art to the present disclosure or the appended claims.

SUMMARY

This Summary section is provided to introduce simplified concepts of speculative activation for secure element usage. These simplified concepts are further described below in the Detailed Description. Accordingly, this section is not intended to identify essential features of the claimed subject matter nor is it intended for use in determining the scope of the claimed subject matter.

An example of hardware that is intended to enable safe use of information in cryptographic or wireless communication environments is called a secure element (SE). A secure element can include security circuitry that is designed to enable transactions to be performed while keeping information safeguarded. Secure transactions can include, for example, a financial exchange (e.g., a purchase), authentication of a user, authorization to enable access to data or exercise of a right, and so forth. The secure element may be incorporated into an electronic device, such as a smartphone. In some environments, a secure element is paired with a wireless interface unit, such as a near-field communication (NFC) unit. In an example commercial retail scenario, a user of the smartphone can pay for a product at a checkout register using the secure element and the associated NFC unit.

Existing secure elements include each resource that is to be used to perform a secure transaction. With a new paradigm, however, a secure element may use at least one resource entity that is disposed within the electronic device but is external to, or otherwise separate from, the secure element. Using such a resource entity can enable implementation of a smaller and less expensive secure element or can enable more complicated secure transactions to be performed by a secure element of a given size or complexity. Examples of resource entities include a memory (e.g., random-access memory (RAM) or flash memory), an interface (e.g., bus or buffer), and a processor core. Regardless of the desired advantage—implementing a smaller secure element or performing more-complex secure transactions, a secure element leverages a resource entity within the electronic device according to this new paradigm.

Unfortunately, leveraging resource entities can adversely impact the operational efficiency of the electronic device. In some scenarios, related resource entities are kept powered up for rapid access and use by the secure element. In these scenarios, power consumption is inefficient because these resource entities are not permitted to enter a sleep mode or otherwise be powered down. In other scenarios, the related resource entities are permitted to be powered down. In these latter scenarios, a speed of the secure transaction is inefficient because of the delays incurred by powering up the sleeping resource entities.

In contrast, certain described implementations enable a secure element to perform secure transactions in both a power-efficient and a time-efficient manner. Related resource entities can be powered down to conserve power when not in use in accordance with some power management protocol. Further, instead of waiting until a secure transaction is initiated to power up the related resource entities, an activation controller speculatively issues an activation signal that powers up the resource entities.

The activation controller can issue the activation signal prior to initiation of a secure transaction by monitoring at least one sensor output. For example, the activation controller can monitor a geospatial position of the electronic device. Based on the geospatial position matching a secure transaction location, the activation controller can issue the activation signal. As another example, the activation controller can monitor for the presence of an electromagnetic (EM) field. Based on a detected EM field matching one indicative of a secure transaction wireless communication, the activation controller can issue the activation signal before the EM field is sufficiently strong to enable or to start a secure transaction.

In example implementations, an apparatus includes a secure element and a wireless interface unit that are coupled one to another. The apparatus also includes at least one resource entity that is usable by the secure element to perform a secure transaction. An activation controller of the apparatus monitors sensor output for a condition that is predictive of an upcoming secure transaction. Here, sensors may include a positioning unit, a radio, and so forth. Detection of such a condition triggers the activation controller to issue an activation signal. Responsive to the activation signal, at least one of the secure element or the resource entity at least starts to power up before the upcoming secure transaction is initiated. Thus, circuitry to be used to conduct the upcoming secure transaction can be ready when the secure transaction is initiated. With these techniques, the secure element can leverage one or more resource entities of the apparatus to conduct secure transactions while also performing these secure transactions in both a power-efficient and a time-efficient manner.

Aspects described below include an apparatus for speculative activation for secure element usage. The apparatus includes a secure element, a wireless interface unit, a resource entity, and an activation controller. The secure element is configured to process multiple secure transactions. The wireless interface unit is coupled to the secure element and configured to enable the multiple secure transactions via at least one wireless communication. The resource entity is coupled to the secure element and configured to support the multiple secure transactions. The activation controller is coupled to at least one of the secure element or the resource entity. The activation controller is configured to predict an upcoming secure transaction of the multiple secure transactions. The activation controller is also configured to, responsive to prediction of the upcoming secure transaction, issue an activation signal prior to initiation of the upcoming secure transaction.

Aspects described below include a method for speculative activation for secure element usage that is performed by an apparatus. The method includes obtaining at least one sensor output and predicting an upcoming secure transaction using the at least one sensor output. The method also includes, based on the predicting, issuing at least one activation signal to one or more components. The method additionally includes, responsive to the issuing, starting to power up the one or more components before the upcoming secure transaction is initiated. The method further includes initiating, with a secure element, the upcoming secure transaction.

BRIEF DESCRIPTION OF THE DRAWINGS

Apparatuses of and techniques for speculative activation for secure element usage are described with reference to the following drawings. The same numbers are used throughout the drawings to reference like features and components.

DETAILED DESCRIPTION

Overview

Figure 1:
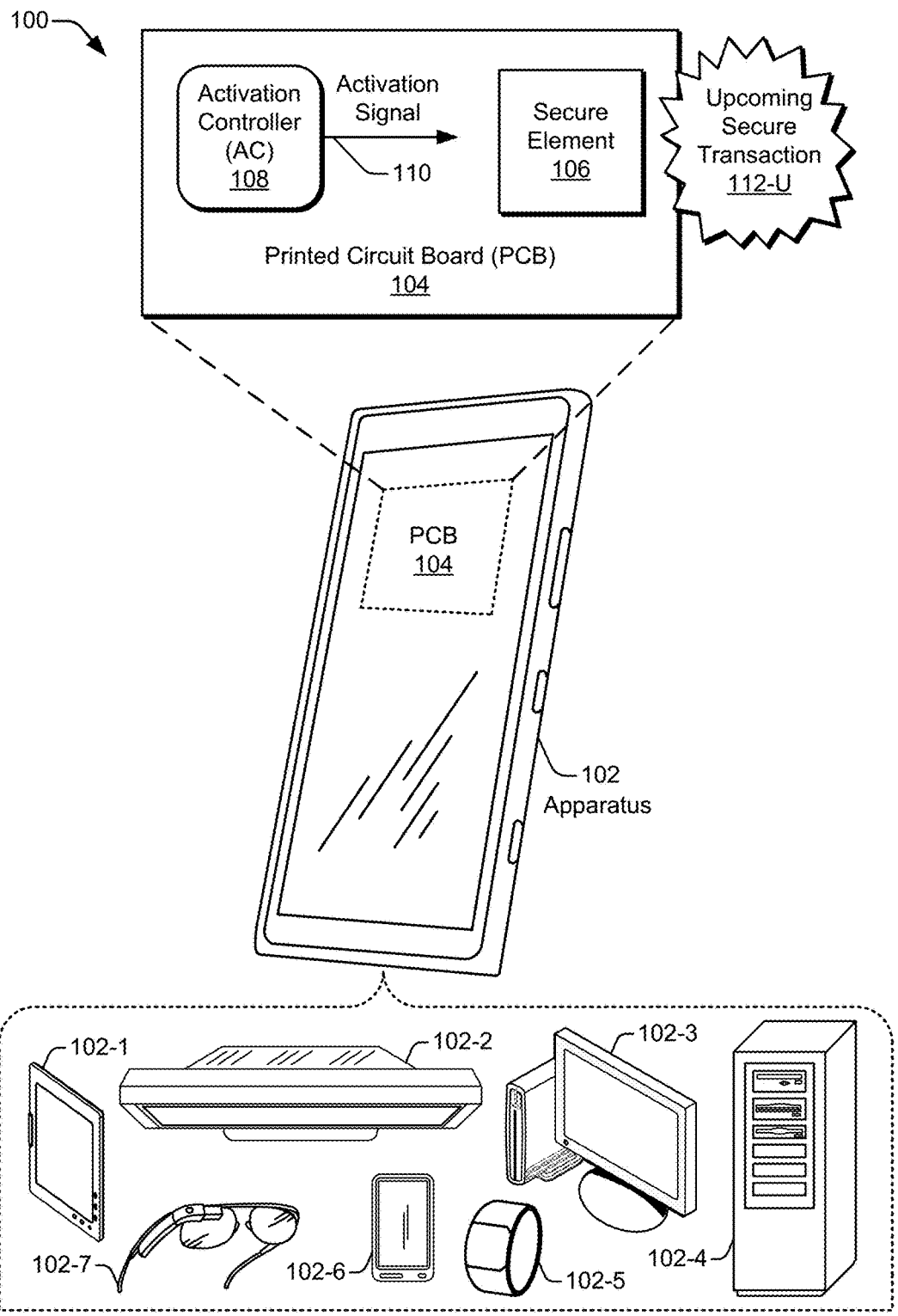
FIG. 1 illustrates an example apparatus with a printed circuit board (PCB) that includes a secure element and an activation controller to implement speculative activation for secure element usage.

Electronic devices engage in activities, including storing valuable information and communicating wirelessly, that may be vulnerable to attacks by bad actors. To thwart such attacks, electronic devices incorporate hardware designed to prevent unauthorized access to information. An example of such hardware is called a secure element (SE). A secure element can include security circuitry that is intended to enable secure transactions to be performed while keeping information safeguarded. Secure transactions can include, for example, a financial exchange (e.g., a purchase of a good or service), an authentication of a user, an authorization to perform a task, and so forth. Generally, a secure element can store secret data, perform or support cryptographic operations, host secure applications, facilitate encrypted communications, and so forth. A secure element may be realized in a tamper-resistant form that attempts to destroy secret data before permitting a physical attack to reveal the secret data.

In some environments, a secure element is paired with a wireless interface unit, such as a near-field communication (NFC) unit. The secure element may be incorporated into an electronic device, such as a smartphone (e.g., a wireless communication device with memory and processing capabilities for executing applications). In an example commercial retail scenario, a user of the smartphone can pay for a product at a store using the secure element and the associated NFC unit. To do so, the user positions the smartphone in proximity to an NFC reader that is part of a register at the store and indicates approval of the purchase. This can happen relatively quickly, and thus seamlessly, if the secure element has the resources required to perform the commercial transaction incorporated within the secure element, like with existing secure elements. For instance, an existing secure element may be implemented as a standalone discrete component that can be connected/paired with an NFC frontend to support contactless transactions with low latency. The secure element is self-contained and ready to execute the transaction as soon as the secure element is awakened by the NFC frontend.

With a new paradigm, however, a secure element may not include all the resources used to perform a secure transaction. For example, a size occupied by a secure element may be decreased to reduce a size or cost of the corresponding electronic device. To do so, the secure element may leverage a resource entity within the electronic device to enable the secure element to perform the same types of secure transactions that could be performed before the size thereof was decreased. As another example, a secure element may be empowered to perform more difficult or complicated secure transactions without incorporating additional hardware resources by leveraging those hardware resource entities that are otherwise present within an electronic device. For instance, a secure element may rely on a central processing unit (CPU) for complex computations or on a main memory to store a large data set. In the former example, cost or size may be reduced while the secure element is still capable of performing certain secure transactions. In the latter example, a size or cost increase may be avoided while still enabling a given secure element to perform more complex secure transactions.

In both examples above, the secure element achieves an advantage by using one or more resource entities that are external to, or otherwise separate from, the secure element to conduct secure transactions. Using a resource entity that is separate from the secure element can also increase power efficiency because the resource entity can be powered down while the secure element continues to operate during times of lower device utilization. However, even if the secure element continues to be powered up, a resource entity that is powered down to conserve energy consumes time while being powered up. This time to power up the resource entity unfortunately introduces a latency before a secure transaction can be performed, and the user experiences the latency as a delay before the secure transaction is completed. This delay causes inconvenience and potential frustration for the user of the electronic device.

It would be advantageous to eliminate, or at least reduce, the delay caused by powering down resource entities that are used by a secure element to perform secure transactions. To do so, in example implementations, an activation controller predicts that an upcoming secure transaction is to be performed before the upcoming secure transaction is initiated. Based on the prediction, the activation controller speculatively generates an activation signal. The activation controller issues the activation signal to a resource entity or a secure element (or both) prior to initiation of the secure transaction. In response to the activation signal, the resource entity or the secure element (or both) are powered up and begin to be initialized or configured for servicing the upcoming secure transaction. In these manners, the resource entity and the secure element can be prepared to conduct a secure transaction earlier than each would be without the speculative issuance of the activation signal. Thus, upon receipt of an inquiry regarding a secure transaction, the secure element can start performing the secure transaction with a shorter delay, if any, due to it or a resource entity being spun-up for operation from a powered down state.

In some implementations, the activation controller can be realized as part of an ambient compute unit (ACU) that can use sensor data to initiate operations within an electronic device. For example, if the ambient compute unit determines that the electronic device is positioned at a location corresponding to secure transaction usage, the ambient compute unit generates and issues an activation signal. In other implementations, the activation controller can be realized as part of a wireless interface unit (e.g., a near-field communication (NFC) unit) that can interact with an external wireless interface unit of a remote electronic device. For example, if the wireless interface unit detects the presence of an electromagnetic field that corresponds to secure transactions, the wireless interface unit can issue an activation signal before the wireless interface unit is within range that is sufficient to be able to communicate using the EM field.

In some environments, resource entities can include a memory, an application processor complex (APC), an interface (e.g., a bus or buffer), and so forth. The activation signal may be implemented as, for example, one or more voltages on at least one line, as an interrupt, as a command or instruction on a messaging bus, or some combination thereof. In example implementations, a system-on-chip (SoC) may include an APC that is coupled to a memory via a first interface and that is coupled to a secure element via a second interface. Thus, based on a predicted upcoming secure transaction, an activation controller can issue an activation signal that wakes up the APC, the memory, and/or at least one interface. The same or a different activation signal can also wake up the secure element, if the secure element was powered down.

The secure element can, for instance, ask the APC over the second interface to access data stored in the memory over the first interface before the upcoming secure transaction is actually initiated with another device. The secure element and any associated resource entities can thus be ready to perform the secure transaction when initiated, even with circuitry that is powered down when unused. These approaches efficiently eliminate, or at least reduce, a delay that the user would otherwise experience without the speculative activation of the secure element or the resource entity based on the predicted upcoming secure transaction. Further, these approaches enable utilization of resource entities that are separate from the secure element in a power-efficient manner.

Example implementations in various levels of detail are discussed below with reference to the associated figures. The discussion below first sets forth an example operating environment and then describes example hardware, schemes, and techniques. Example methods are described thereafter with reference to flow charts or diagrams.

Example Operating Environment

FIG. 1 illustrates, at 100 generally, an example apparatus 102 with a printed circuit board 104 (PCB 104) that includes a secure element 106 and an activation controller 108 (AC 108) to implement speculative activation for secure element usage. In this example, the apparatus 102 is depicted as a smartphone. However, the apparatus 102 may be implemented as any suitable computing or electronic device. Examples of the apparatus 102 include a mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing or watch), Internet of Things (IoTs) device, sensor, stock management device, electronic portion of a machine or some equipment, server computer or portion thereof (e.g., a server blade), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one PCB 104. The PCB 104 can be realized as a flexible PCB, a rigid PCB, a single or multi-layered PCB, a surface-mounted or through-hole PCB, combinations thereof, and so forth. The PCB 104 can include at least one integrated circuit (IC), such as a general-purpose processor, a system-on-chip (SoC), a security-oriented IC, a memory chip, a communications IC (e.g., that performs encryption or decryption on information being transmitted or received), a secure element component, combinations thereof, and so forth. As shown, the PCB 104 includes at least one secure element 106 and at least one activation controller 108, which may be part of separate ICs or integrated together on a single IC.

In example operations, the secure element 106 can execute at least one secure transaction. The activation controller 108 monitors data output by at least one sensor. Using the monitored data, the activation controller 108 can predict an upcoming secure transaction 112-U. Based on the predicted upcoming secure transaction 112-U, the activation controller 108 speculatively generates an activation signal 110. The activation controller 108 can issue the activation signal 110 prior to initiation of the upcoming secure transaction 112-U to awaken relevant components. The activation controller 108 can issue the activation signal 110 to, for example, the secure element 106 and/or one or more resource entities. These components and associated signaling are described with reference to FIG. 2.

Figure 2:
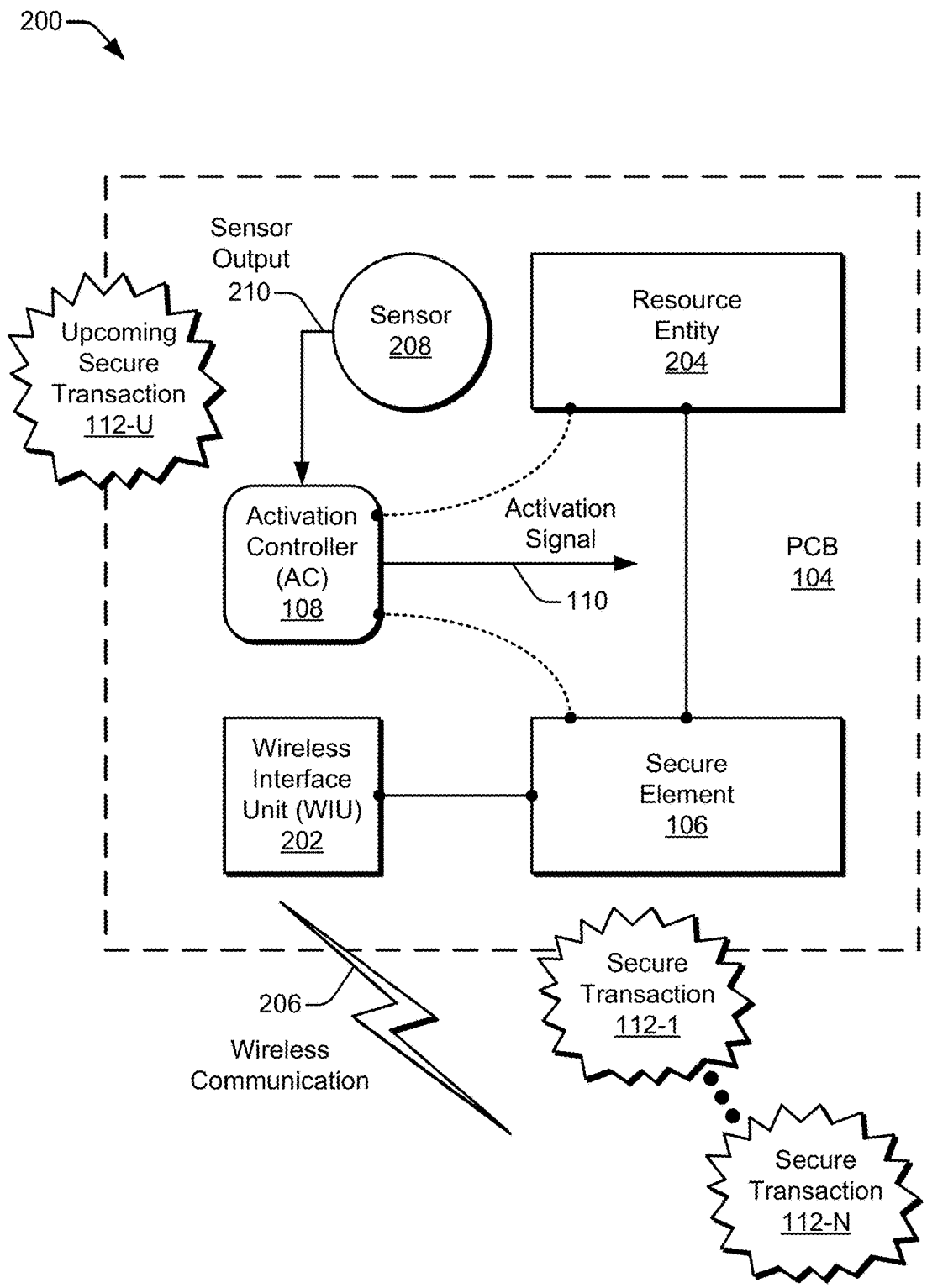
FIG. 2 is a block diagram illustrating an example PCB including a secure element, a resource entity, and an activation controller for speculative activation for secure element usage.

Example Schemes, Techniques, and Hardware for Speculative Activation for Secure Element Usage FIG. 2 is a block diagram 200 illustrating an example PCB 104 including a secure element 106, a resource entity 204, and an activation controller 108 for speculative activation for secure element usage. An electronic device or other apparatus 102 (of FIG. 1) can therefore include at least one secure element 106, at least one activation controller 108, at least one wireless interface unit 202 (WIU 202), at least one resource entity 204, and at least one sensor 208. Although only one of each component is explicitly depicted, an apparatus may include two or more of each component. Further, the components may be distributed across two or more different PCBs 104.

In example implementations, the secure element 106 can process multiple secure transactions 112-1 . . . 112-N, with "N" representing a positive integer. The secure element 106 can be capable, for instance, of processing the multiple secure transactions 112-1 . . . 112-N over time, or the secure element 106 can be capable of processing multiple different types of secure transactions 112. The wireless interface unit 202 is coupled to the secure element 106. The wireless interface unit 202 enables the secure element 106 to process the multiple secure transactions 112-1 . . . 112-N via at least one wireless communication 206. Processing can include, for example, executing, performing, or conducting a secure transaction 112, which may include interaction with a separate device. The wireless communication 206 can be realized as, for instance, a short-range wireless signal, such as one propagated in accordance with an NFC or a Bluetooth™ protocol.

The resource entity 204 is coupled to the secure element 106. The resource entity 204 supports the secure element 106 in the processing of the multiple secure transactions 112-1 . . . 112-N. Examples of support by a resource entity 204 are provided below. The activation controller 108 is coupled to one or more components—e.g., at least one of the secure element 106 or the resource entity 204. As set forth below, an occurrence of the disjunctive "or" herein can indicate that either of the items or any one or more of the items connected by the "or" are implicated or that all the items are implicated. Thus, the activation controller 108 can be coupled to both the secure element 106 and the at least one resource entity 204. The activation controller 108 may also be coupled to at least one sensor 208. The sensor 208 produces sensor output 210 according to one or more sensed parameters or physical characteristics. Examples of the sensor 208 are described below.

In example operations, the activation controller 108 predicts an upcoming secure transaction 112-U of the multiple secure transactions 112-1 to 112-N. Thus, the upcoming secure transaction 112-U is or can become one of the multiple secure transactions 112-1 . . . 112-N. Based on the prediction of the upcoming secure transaction 112-U, the activation controller 108 generates an activation signal 110 prior to initiation of the upcoming secure transaction 112-U. The activation controller 108 can also issue the activation signal 110 to at least one of the secure element 106 or the resource entity 204. Responsive to the activation signal 110, the secure element 106 or the resource entity 204 can at least start to power up and start being configured for operation before the upcoming secure transaction 112-U is initiated. Further, the secure element 106 and the resource entity 204 may be fully ready for operation before initiation of the upcoming secure transaction 112-U.

Some examples of these components and signaling are provided next. A secure transaction 112 can include a financial exchange (e.g., a purchase of a good or service), a data transfer, an authentication, an authorization to perform a task, an encryption or decryption operation, combinations thereof, and so forth. The secure element 106 can be realized as a separate discrete component or integrated with one or more other components. In some cases, the secure element 106 can execute, or otherwise process, a secure transaction 112 in coordination with the wireless interface unit (WIU) 202. The wireless interface unit 202 can be implemented as, for example, a near-field communication (NFC) unit or a Bluetooth™ radio. The secure element 106 and the wireless interface unit 202 can be paired together in some environments.

The resource entity 204 includes circuitry that provides at least one resource to the secure element 106 to support processing of a secured transaction 112. The provided resource can include data, storage, processing power, communication bandwidth, and so forth. Examples of a resource entity 204 include at least one interface, one or more processors, at least one memory, at least one memory controller, and at least one biometric reader. The interface can be realized as a shared or dedicated bus, an interconnect, a switching fabric, a buffer, and so forth. The one or more processors can be realized as a core, an application processor complex (APC), and so forth. The memory can be implemented as a random-access memory (e.g., double-data rate (DDR) RAM), a cache memory, a flash memory, and so forth. Examples of a biometric reader include a fingerprint scanner, an iris scanner, and a camera or radar unit for facial recognition.

The activation controller 108 can be implemented as part of various components, as a standalone component, distributed across multiple components, and so forth. For example, the activation controller 108 (AC 108) can be implemented as part of the wireless interface unit 202 (e.g., as part of an NFC unit). An example of this approach is described below with reference to FIG. 5. Additionally or alternatively, the activation controller 108 (AC 108) can be implemented as part of an ambient compute unit (ACU). An example of this approach is described below with reference to FIG. 6. The activation controller 108 can also be implemented in other manners.

In example implementations, the activation controller 108 issues the activation signal 110 prior to the upcoming secure transaction 112-U being initiated. The upcoming secure transaction 112-U can be initiated by, for example, the secure element 106 sending to a separate device an inquiry about the upcoming secure transaction 112-U. Alternatively, the upcoming secure transaction 112-U can be initiated by, for example, the secure element 106 receiving from a separate device an inquiry about the upcoming secure transaction 112-U. An inquiry can include, for instance, a first command that is emitted by a separate device, such as an NFC reader. A separate device may be proximate to or remote from an electronic device having the PCB 104.

The activation controller 108 can provide the activation signal 110 to the secure element 106 or the resource entity 204. The activation signal 110 can be implemented as an interrupt, a command, an instruction, and so forth. Additionally or alternatively, the activation signal 110 can be realized as at least one voltage that is driven on one or more conductive lines, as a message that is placed on a bus, or some combination thereof. For example, the activation signal 110 can comprise a differential signal propagated over two metallic traces. Responsive to the activation signal 110, a component that was powered down starts to power up and may also begin being initialized or configured to process a secure transaction 112.

In some cases, circuitry that is powered down is in a low-power state or a sleep mode or has undergone some measure of a power collapse. Thus, the power down can be full or partial. The circuitry is, however, sufficiently powered down such that the component cannot process or support a secure transaction 112 before being powered up. In other words, a component that is powered down has insufficient power to perform a function relevant to the upcoming secure transaction 112-U. In contrast, a component that is powered up is awakened and repowered to a degree that the component has sufficient power to perform the relevant function for the upcoming secure transaction 112-U.

Figure 3:
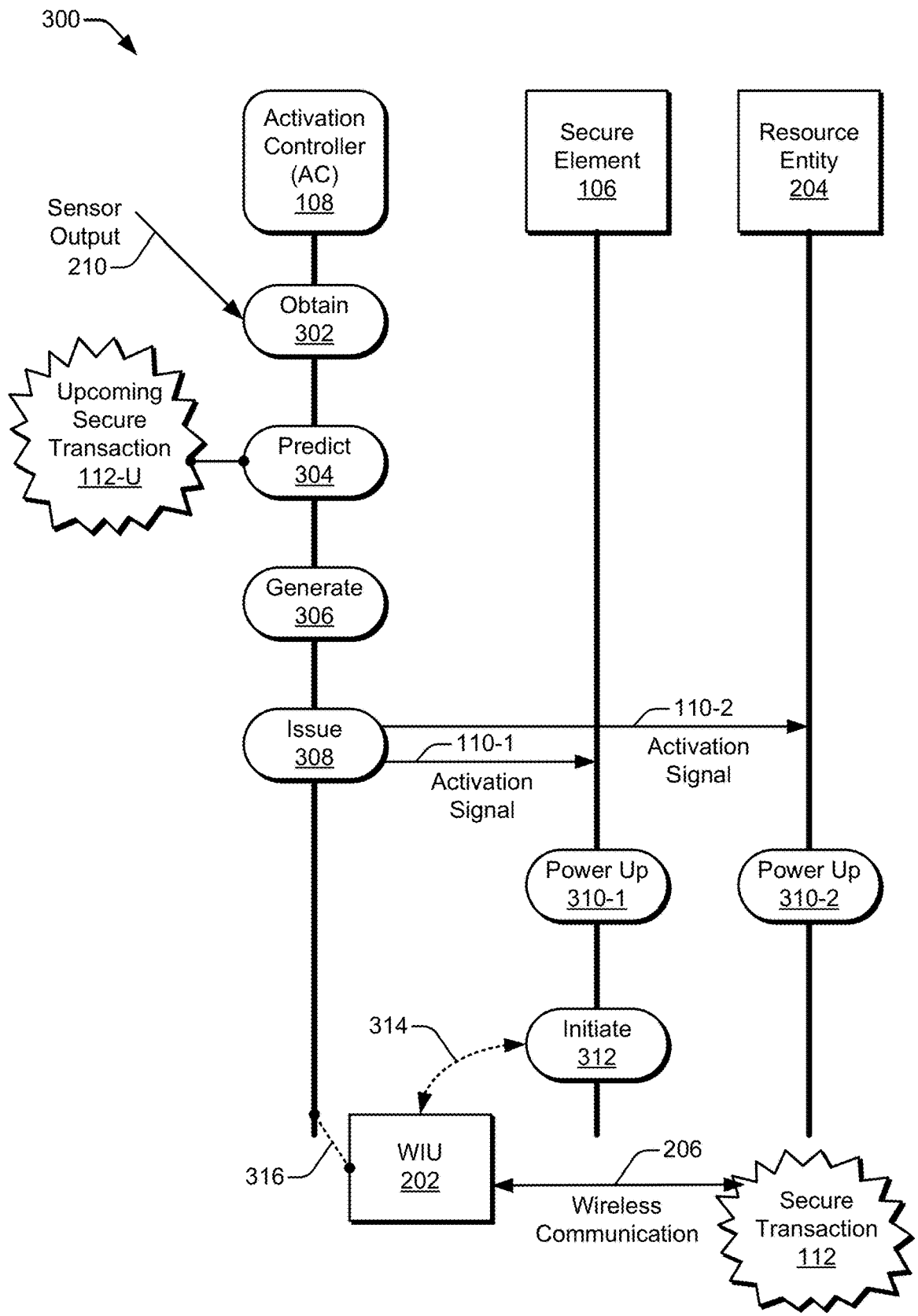
FIG. 3 is a sequence diagram illustrating an example procedure involving an activation controller and at least one of a secure element or a resource entity for speculative activation for secure element usage.

FIG. 3 is a sequence diagram illustrating an example procedure 300 involving an activation controller 108 and at least one of a secure element 106 or a resource entity 204 for speculative activation for secure element usage. The procedure 300 may also involve multiple resource entities 204 or a wireless interface unit 202. At 302, the activation controller 108 obtains sensor input 210 from a sensor 208 (e.g., of FIG. 2). The sensor input 210 may include, for example, a geospatial position, an EM field detection, a strength of a detected EM field or signal, an identity of a wireless local area network (WLAN), and so forth. Using the sensor input 210, the activation controller 108 predicts at 304 that a secure transaction 112 is upcoming—e.g., predicts an upcoming secure transaction 112-U. Based on the prediction, the activation controller 108 generates at least one activation signal 110 at 306.

At 308, the activation controller 108 issues the at least one activation signal 110. The generation or the issuance can depend on what type of secure transaction 112 is predicted to be upcoming or what separate companion device may be involved in the predicted upcoming secure transaction 112-U. For example, the transaction type or companion device can indicate what one or more resources will be used to process the upcoming secure transaction 112-U. As part of the issuance at 308, the activation controller 108 can issue a first activation signal 110-1 to the secure element 106 and a second activation signal 110-2 to the resource entity 204. The first and second activation signals 110-1 and 110-2 may be implemented as separate signals or as one signal that reaches multiple components. Alternatively, the activation controller 108 may issue one activation signal 110 to a single component—e.g., just the secure element 106 or only the resource entity 204.

Responsive to the first activation signal 110-1, the secure element 106 powers up at 310-1. For instance, the secure element 106 can perform initialization or configuration activities to prepare to execute a secure transaction 112. At 310-2, the resource entity 204 powers up responsive to the second activation signal 110-2. For example, an active link between the secure element 106 and an SoC can be resumed. Additionally or alternatively, an application processor complex (APC) can have power reconnected after a power collapse, or a Secure Simple Pairing (SSP) bundle may be loaded in an SSP-compliant platform. The power up at 310-1 or 310-2 may be at least started before the upcoming secure transaction 112-U is initiated. Further, the power up at 310-1 or 310-2 may be completed prior to initiation of the upcoming secure transaction 112-U.

At 312, the secure transaction 112 is initiated. The initiation may be triggered by the wireless interface unit 202 in conjunction with the secure element 106 as indicated by arrow 314. Alternatively, the initiation may be triggered by a different wireless interface unit of a separate device (not shown in FIG. 3). The initiation of the secure transaction 112 may include an exchange (e.g., a transmission or emanation and a reception) of at least one wireless communication 206. As indicated by the dashed line 316, the activation controller 108 can be incorporated into the wireless interface unit 202 for some implementations, examples of which are described below with reference to FIG. 5.

Figure 4:
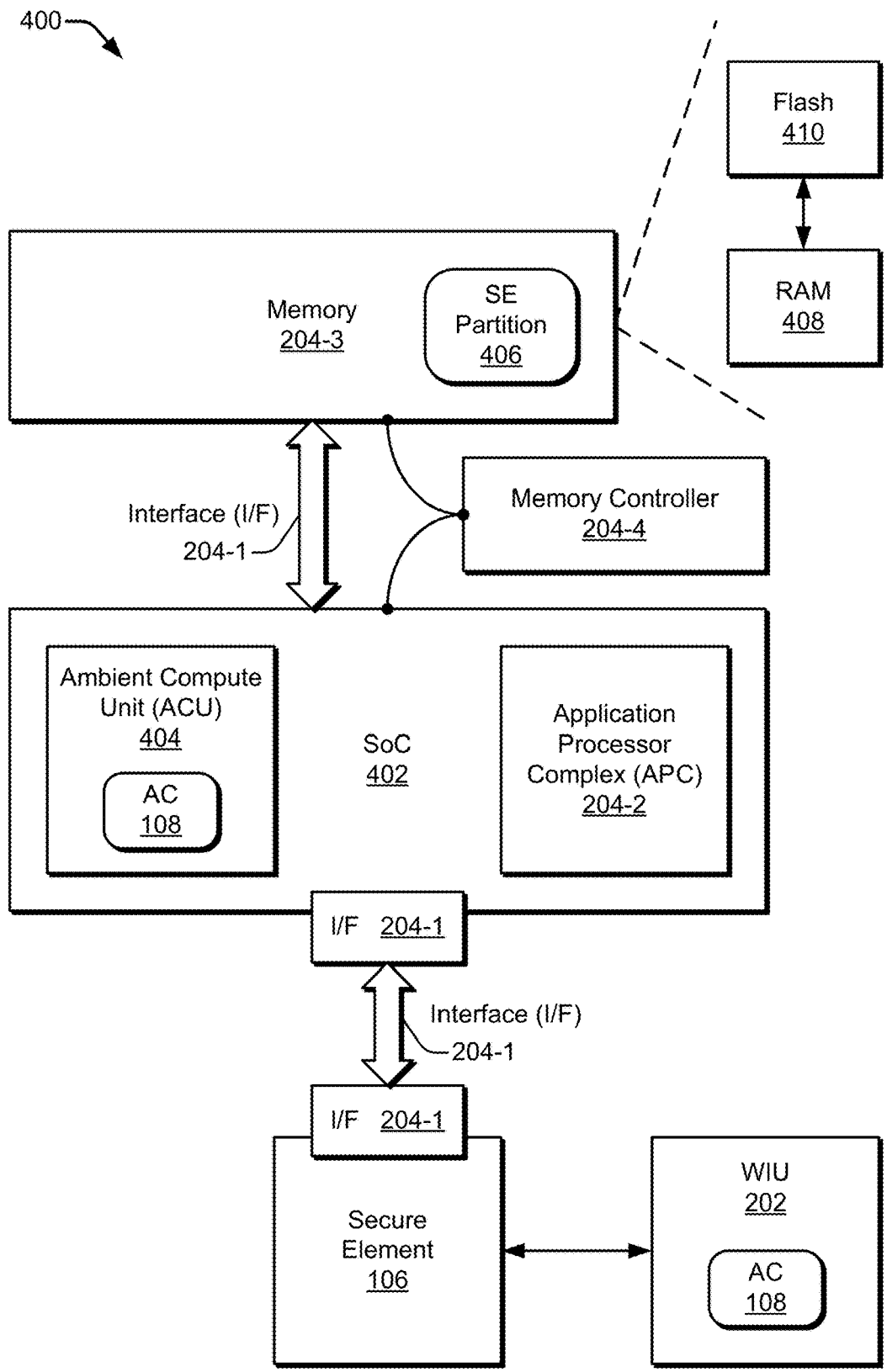
FIG. 4 is a schematic diagram illustrating an example architecture that can include a system-on-chip (SoC) or memory as part of a scheme to implement speculative activation for secure element usage.

FIG. 4 is a schematic diagram illustrating an example architecture 400 that can include a system-on-chip 402 (SoC 402) or a memory 204-3 as part of a scheme to implement speculative activation for secure element usage. The architecture 400 also includes the secure element 106, the wireless interface unit 202, and the resource entity 204. With reference also to FIGS. 2 and 3, the resource entity 204 can be implemented as at least one interface 204-1, as at least one application processor complex 204-2 (APC 204-2), as at least one memory 204-3, as at least one memory controller 204-4, some combination thereof, and so forth. As illustrated, the SoC 402 includes the application processor complex 204-2 and an ambient compute unit 404 (ACU 404). The memory 204-3 can be realized as random-access memory 408 (RAM 408), as flash memory 410, as a hierarchical memory including both RAM 408 and flash memory 410, and so forth. Although only a single secure element 106 is depicted in FIG. 4, an electronic device may include multiple secure elements.

In some implementations, the activation controller 108 can be incorporated into the wireless interface unit 202. An example of this approach is described below with reference to FIG. 5. In other implementations, the activation controller 108 can be incorporated into the ambient compute unit 404. An example of this approach is described below with reference to FIG. 6. The activation controller 108 can also be implemented in both the wireless interface unit 202 and the ambient compute unit 404. Thus, a separate instance of an activation controller 108 can be implemented in each component, or a distributed activation controller 108 can be implemented across both components. Further, an activation controller 108 can be implemented as part of another component or as a standalone component.

The memory 204-3 can include a secure element partition 406 that stores data for the secure element 106 for use during execution of at least some secure transactions 112. The memory controller 204-4 can be implemented to facilitate access to the memory 204-3. Examples include a DDR controller and a Universal Flash Storage (UFS) controller. The application processor complex 204-2 includes one or more cores or application processors and supporting circuitry to implement various functions of an electronic device. Thus, the application processor complex 204-2 may include a general-purpose core, a cryptographic core, a graphics-oriented core, a tensor core, modem circuitry, and so forth. The interface 204-1 (I/F 204-1) can include one or more interface structures. Illustrated examples of the interface 204-1 include a first bus linking the SoC 402 to the secure element 106 and a second bus coupling the SoC 402 to the memory 204-3. Other illustrated examples of the interface 204-1 include a buffer at the secure element 106 for the first bus and another buffer at the SoC 402 for the first bus. Buffers can also couple the SoC 402 and the memory 204-3 to the second bus. A bus or buffer can be implemented in accordance with any bus protocol, such as peripheral component interconnect express (PCIe) or Universal Flash Storage (UFS).

In example operations, if conducting a secure transaction involves leveraging a resource of the application processor complex 204-2, the activation controller 108 may speculatively power up the first bus (e.g., the interface 204-1 extending between the secure element 106 and the SoC 402) and the application processor complex 204-2. If conducting a secure transaction involves leveraging the memory 204-3, such as to access the secure element partition 406, the activation controller 108 may additionally send at least one activation signal 110 to the memory 204-3 or the second bus (e.g., the interface 204-1 that provides access to the memory 204-3).

The various components depicted in FIG. 4 (and FIGS. 2, 5, 6, and 8) may be illustrated with separate blocks to indicate that each can be implemented as a discrete part. However, these illustrations are examples only. The depicted components can be combined, integrated, or separated in different manners. For example, the memory 204-3 or the secure element 106 may be integrated with the application processor complex 204-2 as part of the SoC 402. Additionally or alternatively, the ambient compute unit 404 may not be integrated with the application processor complex 204-2; thus, the ambient compute unit 404 may instead be implemented as a standalone component or integrated with the secure element 106 or another unillustrated component. Further, although the two techniques that are described below and depicted in FIGS. 5 and 6 are presented separately, both can be implemented within a single electronic device.

Figure 5:
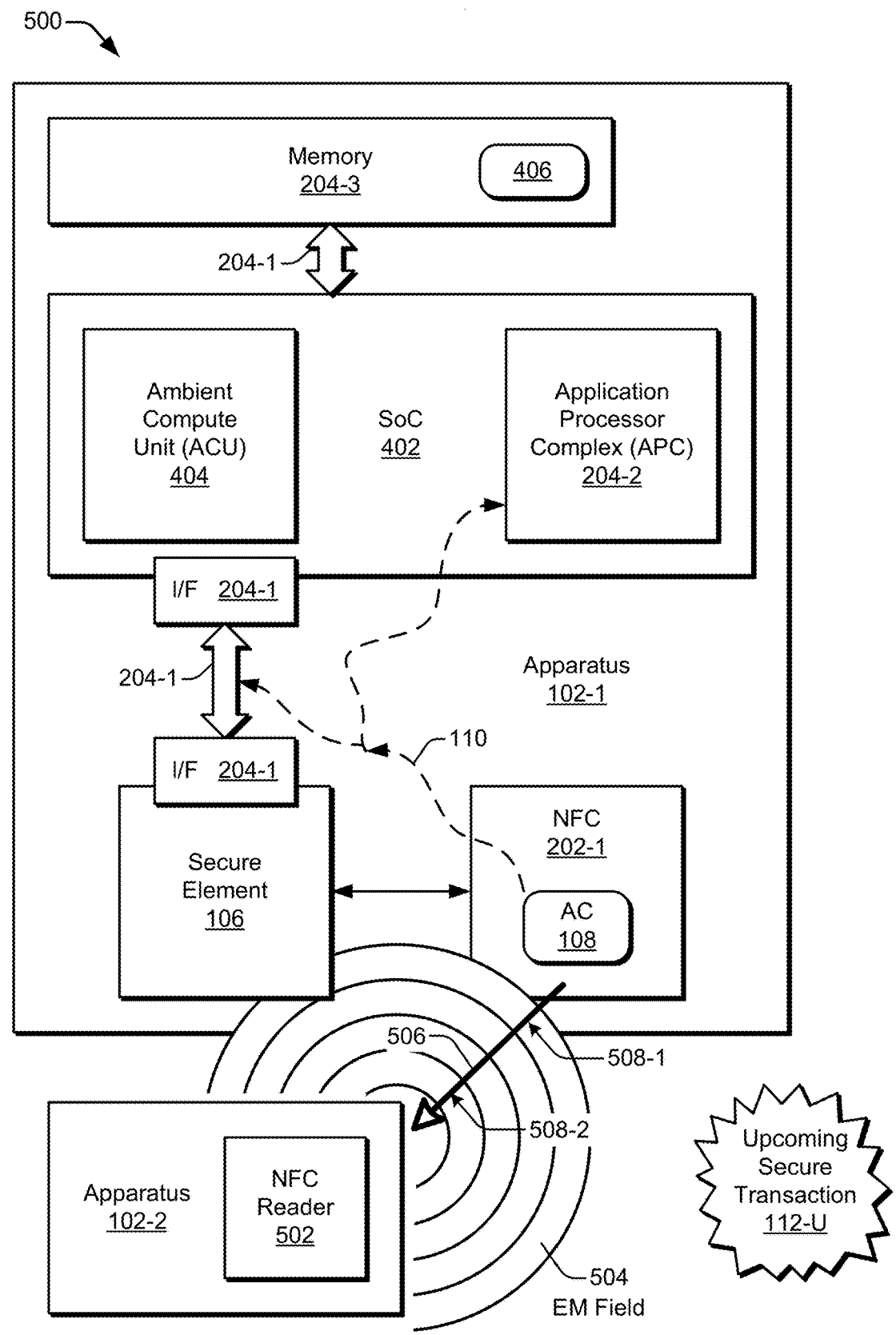
FIG. 5 is a schematic diagram illustrating an example EM-field-based technique for implementing speculative activation for secure element usage in which an activation controller is part of a wireless interface unit that is realized as an NFC unit.
Figure 6:
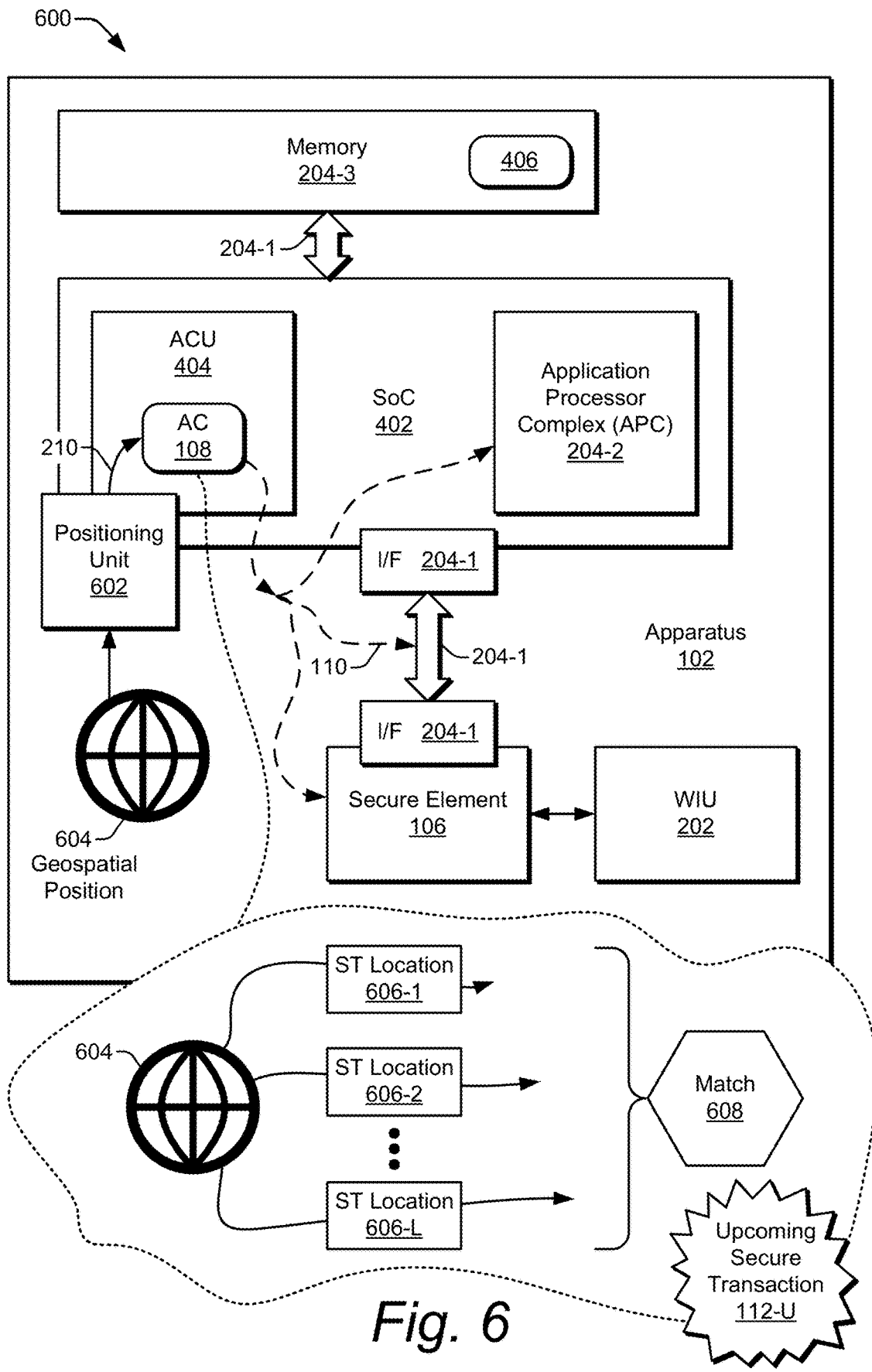
FIG. 6 is a schematic diagram illustrating an example location-based technique for implementing speculative activation for secure element usage in which an activation controller is part of an ambient compute unit (ACU).

FIG. 5 is a schematic diagram illustrating an example EM-field-based technique 500 for implementing speculative activation for secure element usage in which an activation controller 108 is part of a wireless interface unit 202 (e.g. of FIGS. 2 to 4). In the EM-field-based technique 500 of FIG. 5, the wireless interface unit 202 is realized as an NFC unit 202-1. As shown, a first apparatus 102-1 includes the NFC unit 202-1 and the secure element 106, as well as the interface 204-1, the SoC 402, and the memory 204-3. A second apparatus 102-2 includes an NFC reader 502. Here, the sensor 208 (of FIG. 2) of the first apparatus 102-1 is realized as a wireless interface unit 202, which is implemented as the NFC unit 202-1. The NFC unit 202-1 can function as an NFC card emulator, an NFC reader or writer, an NFC peer-to-peer communicator, a combination thereof, and so forth.

In example implementations, the NFC unit 202-1 can detect an EM field 504. The sensor output 210 (of FIG. 2) may therefore include a detection of an EM field for the EM-field-based technique 500. In operation, a user (not shown) is moving the first apparatus 102-1 closer to the second apparatus 102-2, such as by extending a smartphone toward an NFC reader of a register at a store. An expanse 506 of space, which stretches between the first and second apparatuses 102-1 and 102-2, is therefore decreasing. At a first distance 508-1, the NFC unit 202-1 can detect the presence of the EM field 504 that is being emitted by the NFC reader 502. However, the first distance 508-1 from the NFC reader 502 is too large to enable bidirectional wireless communication between the NFC unit 202-1 and the NFC reader 502 via the EM field 504. Thus, at this first distance 508-1, the NFC unit 202-1 cannot yet communicate data with the NFC reader 502, and thus no secure transaction 112 has been initiated.

Nonetheless, due to the detection of the EM field 504, the activation controller 108 at the NFC unit 202-1 predicts an upcoming secure transaction 112-U. Based on the predicted upcoming secure transaction 112-U, the activation controller 108 generates and issues at least one activation signal 110. In this example, the activation controller 108 issues an activation signal 110 to at least the application processor complex 204-2 and the first bus instance of the interface 204-1. The activation controller 108 can, however, issue more, fewer, or different activation signals 110 to more, fewer, or different components that serve as a resource entity 204 for the secure element 106 to perform the upcoming secure transaction 112-U. Although not shown in FIG. 5, the activation controller 108 can also issue an activation signal 110 to the secure element 106.

When the first apparatus 102-1 reaches a shorter, second distance 508-2 along the expanse 506, the EM field 504 is sufficiently strong to enable the NFC unit 202-1 and the NFC reader 502 to communicate (e.g., the EM field 504 is sufficiently strong to establish a connection that is capable of communicating data). Consequently, after a size of the expanse 506 has decreased to the second distance 508-2, the upcoming secure transaction 112-U can be initiated. In an example NFC environment, the second distance 508-2 may correspond to approximately 20 centimeters (cm) or less, and the first distance 508-1 may correspond to approximately 40 cm. In this environment, with a moving hand holding a device, implementing described principles for speculative activation for secure element usage can provide at least a 100 millisecond (ms) lead time to power up and initialize circuitry between a detection of the EM field 504 and an ability to initiate a secure transaction 112. In another example NFC environment, the second distance 508-2 may correspond to approximately 10 cm or less, and the first distance 508-1 may correspond to approximately 25 cm. These distances are, however, presented by way of example only.

FIG. 6 is a schematic diagram illustrating an example location-based technique 600 for implementing speculative activation for secure element usage in which an activation controller 108 is part of an ambient compute unit 404 (ACU 404). As shown, an apparatus 102 includes the secure element 106, the interface 204-1, the application processor complex 204-2, the memory 204-3, and the SoC 402. The SoC 402 is depicted as including, in addition to the application processor complex 204-2, the ambient compute unit

404; however, the ambient compute unit 404 can be implemented separately. In the location-based technique 600 of FIG. 6, the sensor 208 (of FIG. 2) is realized as a positioning unit 602. The positioning unit 602 may be part of or separate from the ambient compute unit 404.

In example implementations, the positioning unit 602 is communicatively coupled to the activation controller 108. The positioning unit 602 determines a geospatial position 604. The sensor output 210 may therefore include a geospatial position 604 for the location-based technique 600. The positioning unit 602 can include a satellite-based positioning system chip (e.g., a Global Positioning System (GPS) chip), an inertial measurement unit (IMU), a position-tracking module, a location-determining system that can utilize Wi-Fi® network names (e.g., Service Set Identifier (SSID)) or cell information, a location-determining system that can use trilateration with multiple base stations, combinations thereof, and so forth. Thus, the geospatial position 604 can include geospatial coordinates, a waypoint or location plus a distance, a name of a wireless network, a name of a place, a geographic area, and so forth.

In example operations, the activation controller 108 obtains the geospatial position 604 from the positioning unit 602. The activation controller 108 determines if the geospatial position 604 matches a location that is associated with a secure transaction (ST Location 606). This match determination is based on at least one comparison. To make a comparison, the activation controller 108 can have a list of secure transaction locations that are established over time by inserting an entry each time a secure transaction is executed, by downloading a database of secure transaction locations, combinations thereof, and so forth. As shown, multiple secure transaction locations 606-1, 606-2, ..., 606-L, with "L" representing a positive integer, are available to the activation controller 108. The activation controller 108 compares the geospatial position 604 with one or more locations of the multiple secure transaction locations 606-1 ... 606-L to determine if there is a match 608.

If the activation controller 108 determines that there is a match 608 of the current geospatial position 604 to a known secure transaction location 606, the activation controller 108 predicts an upcoming secure transaction 112-U. Based on the predicted upcoming secure transaction 112-U, the activation controller 108 issues at least one activation signal 110. In this example, the activation controller 108 issues an activation signal 110 to three destinations: the secure element 106, the application processor complex 204-2 of the SoC 402, and the first bus instance of the interface 204-1 (which links the secure element 106 to the SoC 402). However, the activation controller 108 can issue an activation signal 110 to more, fewer, or different components that may support the upcoming secure transaction 112-U. For instance, if the activation controller 108 of the ambient compute unit 404 determines that the apparatus 102 is at a public transportation location, the activation controller 108 can issue an activation signal 110 to the memory 204-3 if the secure element partition 406 stores data relating to a public transportation payment account or an available rider balance for the public transportation system.

In other implementations, the activation controller 108 can issue an activation signal 110 based on a geospatial position 604 that is relative to another electronic device based on ultra wide band (or ultra wideband) (UWB) signaling, which can be used for fine ranging and localization. In some cases, ultra wide band signaling can be realized in accordance with, for instance, an IEEE 802.15.4a standard. The wireless interface unit 202, or another wireless interface unit that is coupled to the ambient compute unit 404, can be implemented as an ultra wide band radio. In operation, the ultra wide band wireless interface unit can function as an initiator or as a responder in a ranging procedure to determine a range (e.g., a distance) to another electronic device. The range to the other electronic device, which is or has been a participant in a secure transaction, may correspond to a secure transaction location 606. In an example environment, based on ultra wide band signaling by a wireless interface unit, the ambient compute unit 404 can determine that a user is approaching their car. In response to this determination, the ambient compute unit 404 can issue the activation signal 110 to turn on the wireless interface unit 202 (e.g., an NFC unit) to use the secure element 106 as a car key.

Having generally described schemes, techniques, and hardware for speculative activation for secure element usage, this discussion now turns to example methods.

Example Methods for Speculative Activation for Secure Element Usage

Example methods are described below with reference to the flow diagram of FIG. 7. Aspects of these methods may be implemented in, for example, hardware (e.g., fixed logic circuitry or a processor in conjunction with a memory), firmware, software, or some combination thereof. The processes may be realized using one or more of the apparatuses or components shown in FIGS. 1 to 6 and 8, which components may be further divided, combined, and so on. The devices and components of these figures generally represent firmware; hardware, such as electronic devices, packaged modules, IC chips, or circuits; software; or a combination thereof. Thus, these figures illustrate some of the many possible systems or apparatuses capable of implementing the described methods.

For these flow diagrams, the orders in which operations are shown and/or described are not intended to be construed as a limitation. Any number or combination of the described method operations can be combined in any order to implement a given method, or an alternative method. Operations may also be omitted or added to the described methods. Further, described operations can be implemented in fully or partially overlapping manners.

Figure 7:
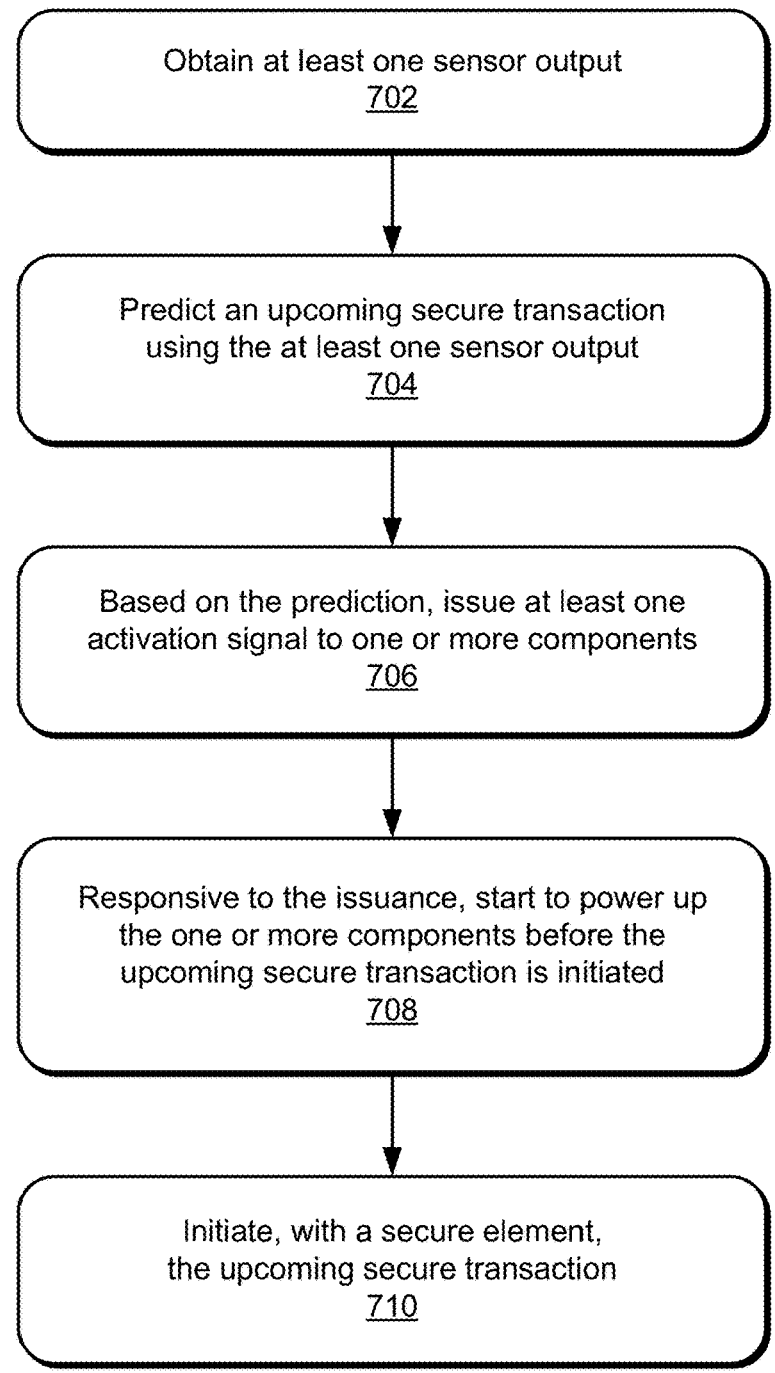
FIG. 7 illustrates example methods for an apparatus to implement speculative activation for secure element usage.

FIG. 7 illustrates, with a flow diagram 700, example methods for an apparatus to implement speculative activation for secure element usage. The flow diagram 700 includes five blocks 702-710. At 702, at least one sensor output is obtained. For example, an apparatus can obtain at least one sensor output 210 using at least one sensor 208. In some cases, the sensor 208 obtains the sensor output 210. For instance, a positioning unit 602 may obtain a geospatial position 604, or a wireless interface unit 202 may sense an EM field 504. In other cases, an activation controller 108 may obtain the sensor output 210 from the sensor 208.

At 704, an upcoming secure transaction is predicted using the at least one sensor output. For example, the activation controller 108 can predict an upcoming secure transaction 112-U using the at least one sensor output 210. To do so with an activation controller 108 that is part of an ambient compute unit 404, the activation controller 108 may predict an upcoming secure transaction 112-U if a geospatial position 604 matches a known secure transaction location 606. To do so with an activation controller 108 that is part of an NFC unit 202-1 implementation of a wireless interface unit 202, the activation controller 108 may predict an upcoming secure transaction 112-U if a detected EM field 504 comports with an EM field known to be used for secure transactions.

At 706, based on the predicting, at least one activation signal is issued to one or more components. For example, based on the prediction, the activation controller 108 can issue at least one activation signal 110 to one or more components. The one or more components may include a secure element 106 or at least one resource entity 204. Examples of resource entities 204 include at least a portion of an SoC 402, a resource of the SoC 402—such as a memory 204-3, and an interface 204-1 between the SoC 402 and the secure element 106 or between the SoC 402 and the memory 204-3.

At 708, responsive to the issuing, a powering up of the one or more components is started before the upcoming secure transaction is initiated. For example, responsive to the issuance of the at least one activation signal 110, the one or more components or a power manager thereof can start to power up the one or more components before the upcoming secure transaction 112-U is initiated. Here, power may be connected to the secure element 106 and the at least one interface 204-1. Further, the secure element 106 may be initialized for processing, and the interface 204-1 may be configured for operation.

At 710, the upcoming secure transaction is initiated with a secure element. For example, a secure element 106 can interact with another apparatus to initiate the upcoming secure transaction 112-U. In some cases, an inquiry or offer to begin a secure transaction 112 may be exchanged between the wireless interface unit 202 of the apparatus 102 and another wireless interface unit of another apparatus. The inquiry can be formulated by the secure element 106 and transmitted by the wireless interface unit 202 of the apparatus 102, or the inquiry can be sent by the other apparatus. The inquiry can be realized as at least one external wireless communication requesting the upcoming secure transaction 112-U.

Example Electronic Device

Figure 8:
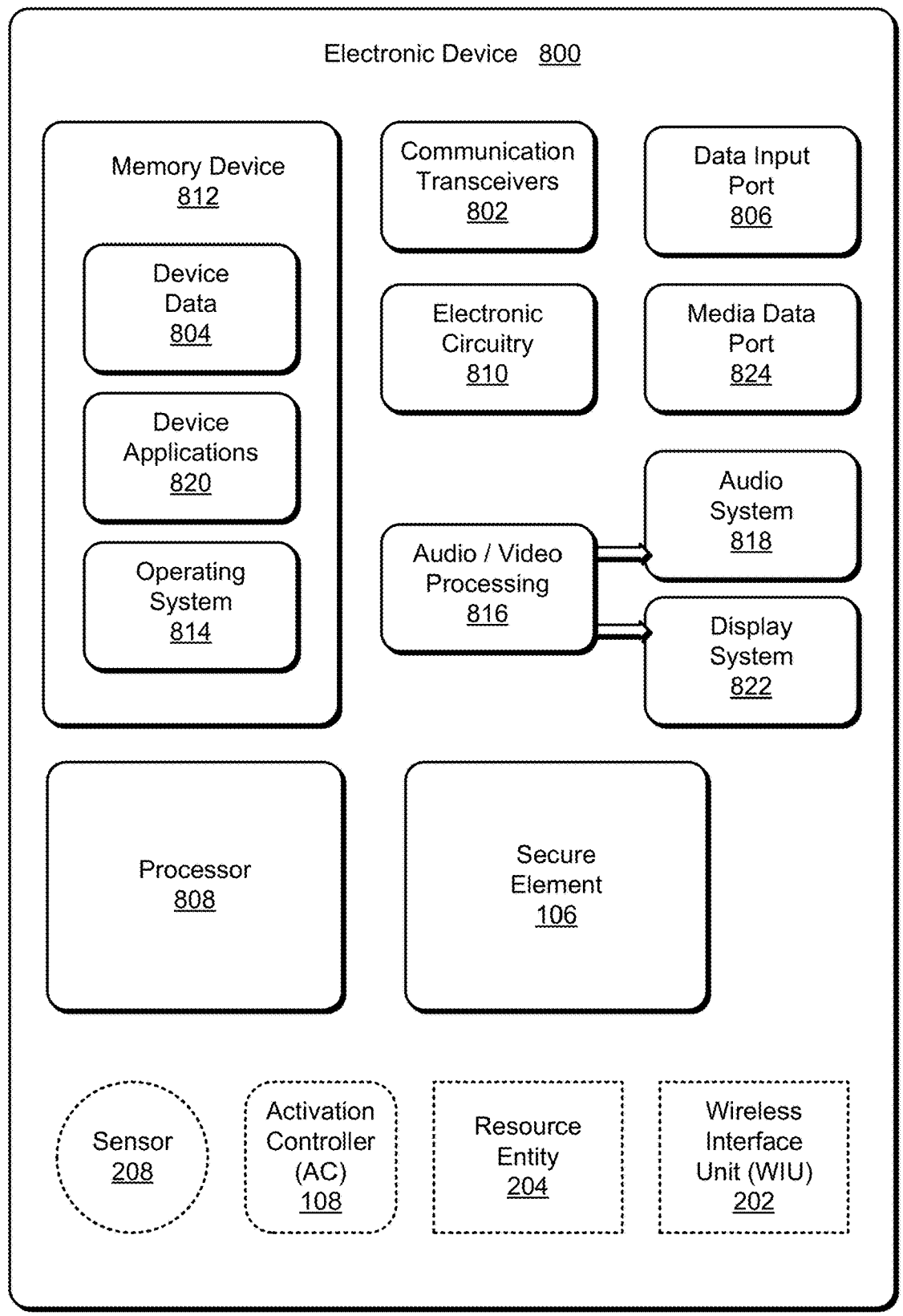
FIG. 8 illustrates various components of an example electronic device that can implement speculative activation for secure element usage in accordance with one or more described aspects.

FIG. 8 illustrates various components of an example electronic device 800 that can implement speculative activation for secure element usage in accordance with one or more described aspects. The electronic device 800 may be implemented as any one or combination of a fixed, mobile, stand-alone, or embedded device; in any form of a consumer, computer, portable, user, server, communication, phone, navigation, gaming, audio, camera, messaging, media playback, and/or other type of electronic device 800, such as the smartphone that is depicted FIG. 1 as the apparatus 102.

Electronic device 800 can include one or more communication transceivers 802 that enable wired and/or wireless communication of device data 804, such as received data, transmitted data, or other information as described above. Example communication transceivers 802 include NFC transceivers, wireless personal area network (PAN) (WPAN) radios compliant with various IEEE 802.15 (Bluetooth™) standards, wireless local area network (LAN) (WLAN) radios compliant with any of the various IEEE 802.11 (Wi-Fi™) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 800 may also include one or more data input ports 806 via which any type of data, media content, and/or other inputs can be received, such as user-selectable inputs, messages, applications, music, television content, recorded video content, and any other type of audio, video, and/or image data received from any content and/or data source. The data input ports 806 may include USB ports, coaxial cable ports, fiber optic ports for optical fiber interconnects or cabling, and other serial or parallel connectors (including internal connectors) for flash memory, DVDs, CDs, and the like. These data input ports 806 may be used to couple the electronic device to components, peripherals, or accessories such as keyboards, microphones, cameras, or other sensors.

The electronic device 800 of this example includes at least one processor 808 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 808 may be implemented as an application processor, embedded controller, microcontroller, security processor, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 800 can be implemented with any one or combination of electronic circuitry, which may include software, hardware, firmware, or fixed logic circuitry that is implemented in connection with processing and control circuits, which are generally indicated at 810 (as electronic circuitry 810). This electronic circuitry 810 can implement executable or hardware-based modules (not shown in FIG. 8), such as through processing/computer-executable instructions stored on computer-readable media, through logic circuitry and/or hardware (e.g., such as an FPGA), and so forth.

Although not shown, the electronic device 800 can include a system bus, interconnect, crossbar, switch fabric, or data transfer system that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 800 also includes one or more memory devices 812 that enable data storage, examples of which include random access memory (RAM), non-volatile memory (e.g., read-only memory (ROM), flash memory, EPROM, and EEPROM), and a disk storage device. Thus, the memory device(s) 812 can be distributed across different logical storage levels of a system as well as at different physical components. The memory device(s) 812 provide data storage mechanisms to store the device data 804, other types of code and/or data, and various device applications 820 (e.g., software applications or programs). For example, an operating system 814 can be maintained as software instructions within the memory device 812 and executed by the processor 808.

In some implementations, the electronic device 800 also includes an audio and/or video processing system 816 that processes audio data and/or passes through the audio and video data to an audio system 818 and/or to a display system 822 (e.g., a video buffer or a screen of a smartphone or camera). The audio system 818 and/or the display system 822 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as a media data port 824. In some implementations, the audio system 818 and/or the display system 822 are external or separate components of the electronic device 800. Alternatively, the display system 822, for example, can be an integrated component of the example electronic device 800, such as part of an integrated touch interface.

The electronic device 800 of FIG. 8 is an example implementation of the apparatus 102 of FIG. 1. Thus, the processor 808 is an example of at least part of the application processor complex 204-2 or the SoC 402 (e.g., of FIG. 4). The electronic device 800 is illustrated as also including a secure element 106, a sensor 208, a resource entity 204, a wireless interface unit 202, and an instance of an activation controller 108. As described above, one or more of these components may be part of a same IC chip such as that of the processor 808 or may instead be located on a separate die. The sensor 208 may be implemented as one of the communication transceivers 802. The wireless interface unit 202 may also be implemented as one of the communication transceivers 802. The resource entity 204 may correspond to the processor 808, the memory device 812, the unillustrated interconnect, and so forth. An ambient compute unit 404 (e.g., of FIG. 4) may be realized as part of the electronic circuitry 810 or the processor 808. Thus, the activation controller 108 may be instantiated at the processor 808, the electronic circuitry 810, one of the communication transceivers 802, and so forth. Although not explicitly illustrated, the memory device 812 may store the secure element partition 406 (e.g., of FIG. 4) as part of the device data 804. Thus, the principles of speculative activation for secure element usage as described herein can be implemented by, or in conjunction with, the electronic device 800 of FIG. 8.

Additional Examples

In the following, some examples are described.

Example 1: An apparatus comprising: a secure element configured to process multiple secure transactions; a wireless interface unit coupled to the secure element and configured to enable the multiple secure transactions via at least one wireless communication; a resource entity coupled to the secure element and configured to support the multiple secure transactions; and an activation controller coupled to at least one of the secure element or the resource entity, the activation controller configured to: predict an upcoming secure transaction of the multiple secure transactions; and responsive to prediction of the upcoming secure transaction, issue an activation signal prior to initiation of the upcoming secure transaction.

Example 2: The apparatus of example 1, wherein: the activation controller is configured to issue the activation signal to the resource entity; and the resource entity is configured to power up responsive to the activation signal.

Example 3: The apparatus of example 2, wherein the resource entity is configured to power up by awakening from a sleep mode.

Example 4: The apparatus of any one of examples 1 to 3, wherein: the activation controller is configured to issue the activation signal to the secure element; and the secure element is configured to power up responsive to the activation signal.

Example 5: The apparatus of any one of examples 1 to 4, wherein the wireless interface unit comprises a near-field communication, NFC, unit.

Example 6: The apparatus of any one of examples 1 to 5, wherein the resource entity comprises at least one of an application processor complex (APC), a memory, or at least one interface.

Example 7: The apparatus of example 6, further comprising: a system-on-chip (SoC), the SoC comprising at least the application processor complex, wherein the at least one interface is coupled between at least one of: the SoC and the secure element; or the SoC and the memory.

Example 8: The apparatus of any one of examples 1 to 7, wherein the upcoming secure transaction is initiated based on at least one external wireless communication that is exchanged between the wireless interface unit and an external wireless interface unit of a separate apparatus, the at least one external wireless communication requesting the upcoming secure transaction.

Example 9: The apparatus of example 8, wherein: the wireless interface unit comprises a near-field communication, NFC, unit; the external wireless interface unit comprises an NFC reader; and the at least one external wireless communication comprises a first command emitted by the NFC reader.

Example 10: The apparatus of any one of examples 1 to 9, wherein the activation controller is configured to predict the upcoming secure transaction based on detection of an electromagnetic field.

Example 11: The apparatus of example 10, wherein: the activation controller comprises part of the wireless interface unit; and the wireless interface unit is configured to: detect the electromagnetic field; and generate the activation signal before the electromagnetic field is sufficiently strong to establish a connection that is capable of communicating data.

Example 12: The apparatus of any one of examples 1 to 11, wherein the activation controller is configured to predict the upcoming secure transaction based on a geospatial position of the apparatus.

Example 13: The apparatus of example 12, wherein: the activation controller comprises part of an ambient compute unit; and the ambient compute unit is configured to: determine the geospatial position of the apparatus; and issue the activation signal based on a comparison of the geospatial position of the apparatus to one or more locations that are each associated with at least one secure transaction.

Example 14: The apparatus of example 12, wherein: the activation controller comprises part of an ambient compute unit; and the ambient compute unit is configured to: determine a range to another apparatus using ultra wide band, UWB, signaling; and issue the activation signal based on the range to the other apparatus.

Example 15: The apparatus of any one of examples 1 to 14, further comprising. one or more conductive lines coupled between the activation controller and a system-on-chip, SoC, wherein: the activation controller is configured to drive at least one voltage on the one or more conductive lines to issue the activation signal.

Example 16: The apparatus of any one of examples 1 to 15, further comprising: a memory controller coupled to a system-on-chip, SoC, wherein: the activation signal comprises one or more activation signals; the SoC comprises at least one application processor; the activation controller is configured to issue the one or more activation signals to the memory controller; and responsive to the one or more activation signals, the at least one application processor and the memory controller are configured to power up.

Example 17: A method for speculative activation for secure element usage, the method comprising: obtaining at least one sensor output; predicting an upcoming secure transaction using the at least one sensor output; based on the predicting, issuing at least one activation signal to one or more components; responsive to the issuing, starting to power up the one or more components before the upcoming secure transaction is initiated; and initiating, with a secure element, the upcoming secure transaction.

Example 18: The method of example 17, wherein: the at least one sensor output comprises at least one geospatial position; the obtaining comprises determining the at least one geospatial position; and the predicting comprises matching, by an ambient compute unit, the at least one geospatial position to a location that is associated with at least one secure transaction.

Example 19: The method of example 17 or 18, wherein: the at least one sensor output comprises at least one electromagnetic field detection; and the obtaining comprises sensing, by a wireless interface unit, an electromagnetic field.

Example 20: The method of example 19, wherein: the wireless interface unit comprises a near-field communication, NFC, unit; and the predicting comprises detecting, by the NFC unit, the electromagnetic field at a distance from an NFC reader that is too large to enable wireless communication via the electromagnetic field between the NFC unit and the NFC reader.

Example 21: The method of any one of examples 17 to 20, wherein the one or more components comprise at least one interface that couples the secure element to an application processor complex.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for speculative activation for secure element usage have been described in language specific to certain features and/or methods, the subject of the appended claims is not necessarily limited to the specific features or methods described. Rather, the specific features and methods are disclosed as example implementations for speculative activation for secure element usage.

What is claimed is:

1. An apparatus comprising:
a secure element including security circuitry configured to process multiple secure transactions;
a wireless interface unit coupled to the secure element and configured to enable the multiple secure transactions via at least one wireless communication;
a resource entity coupled to the secure element and configured to support the multiple secure transactions; and
an activation controller coupled to at least one of the secure element or the resource entity, the activation controller configured to:
determine a geospatial position of the apparatus;
predict an upcoming secure transaction of the multiple secure transactions based on a comparison of the geospatial position of the apparatus to one or more locations that are each associated with at least one secure transaction; and
responsive to prediction of the upcoming secure transaction, issue an activation signal prior to initiation of the upcoming secure transaction.

2. The apparatus of claim 1, wherein:
the activation controller is configured to issue the activation signal to the resource entity; and
the resource entity is configured to power up responsive to the activation signal.

3. The apparatus of claim 2, wherein the resource entity is configured to power up by awakening from a sleep mode.

4. The apparatus of claim 1, wherein:
the activation controller is configured to issue the activation signal to the secure element; and
the secure element is configured to power up responsive to the activation signal.

5. The apparatus of claim 1, wherein the wireless interface unit comprises a near-field communication (NFC) unit.

6. The apparatus of claim 1, wherein the resource entity comprises at least one of an application processor complex, a memory, or at least one interface.

7. The apparatus of claim 6, further comprising:
a system-on-chip (SoC), the SoC comprising at least the application processor complex, wherein the at least one interface is coupled between at least one of:
the SoC and the secure element; or
the SoC and the memory.

8. The apparatus of claim 1, wherein the upcoming secure transaction is initiated based on at least one external wireless communication that is exchanged between the wireless interface unit and an external wireless interface unit of a separate apparatus, the at least one external wireless communication requesting the upcoming secure transaction.

9. The apparatus of claim 8, wherein:
the wireless interface unit comprises a near-field communication (NFC) unit; and
the at least one external wireless communication comprises a first NFC command emitted by the external wireless interface unit.

10. The apparatus of claim 1, wherein the activation controller is configured to predict the upcoming secure transaction based on detection of an electromagnetic field.

11. The apparatus of claim 10, wherein:
the activation controller comprises part of the wireless interface unit; and
the wireless interface unit is configured to:
detect the electromagnetic field; and
generate the activation signal before the electromagnetic field is sufficiently strong to establish a connection that is capable of communicating data.

12. The apparatus of claim 1, wherein the apparatus comprises at least one memory configured to store multiple secure transaction locations.

13. The apparatus of claim 1, wherein the activation controller comprises part of an ambient compute unit.

14. The apparatus of claim 1, wherein:
the activation controller comprises part of an ambient compute unit; and
the ambient compute unit is configured to:
determine a range to another apparatus using ultra wide band (UWB) signaling; and
issue the activation signal based on the range to the other apparatus.

15. The apparatus of claim 1, further comprising:
a system-on-chip (SoC), the SoC comprising at least one application processor; and
a memory controller coupled to the SoC, wherein:
the activation signal comprises one or more activation signals;
the activation controller is configured to issue the one or more activation signals to the at least one application processor and the memory controller; and
responsive to the one or more activation signals, the at least one application processor and the memory controller are configured to power up.

16. A method for speculative activation with respect to a secure element of an apparatus, the method comprising:
obtaining at least one sensor output;
determining a geospatial position of the apparatus using the at least one sensor output;
predicting an upcoming secure transaction of multiple secure transactions based on a comparison of the geospatial position of the apparatus to one or more locations that are each associated with at least one secure transaction;
based on the predicting, issuing at least one activation signal to one or more components;
responsive to the issuing, starting to power up the one or more components before the upcoming secure transaction is initiated;
initiating, with the secure element, the upcoming secure transaction using a wireless interface unit; and
supporting, by a resource entity, the upcoming secure transaction.

17. The method of claim 16, wherein:
the at least one sensor output comprises at least one geospatial position; and
the predicting comprises matching, by an ambient compute unit, the at least one geospatial position to a location that is associated with the at least one secure transaction.

18. The method of claim 16, wherein:
the at least one sensor output comprises at least one electromagnetic field detection; and
the obtaining comprises sensing, by the wireless interface unit, an electromagnetic field.

19. The method of claim 18, wherein:
the wireless interface unit comprises a near-field communication (NFC) unit; and
the predicting comprises detecting, by the NFC unit, the electromagnetic field at a distance from an NFC reader that is too large to enable wireless communication via the electromagnetic field between the NFC unit and the NFC reader.

20. An apparatus comprising:
a secure element including security circuitry configured to process multiple secure transactions;
a wireless interface unit coupled to the secure element and configured to enable the multiple secure transactions via at least one wireless communication;
a resource entity coupled to the secure element and configured to support the multiple secure transactions; and
a controller comprising:
means for determining a geospatial position of the apparatus;
means for predicting an upcoming secure transaction of the multiple secure transactions based on a comparison of the geospatial position of the apparatus to one or more locations that are each associated with at least one secure transaction; and
means for issuing an activation signal prior to initiation of the upcoming secure transaction responsive to prediction of the upcoming secure transaction.

* * * * *